Figure 1:
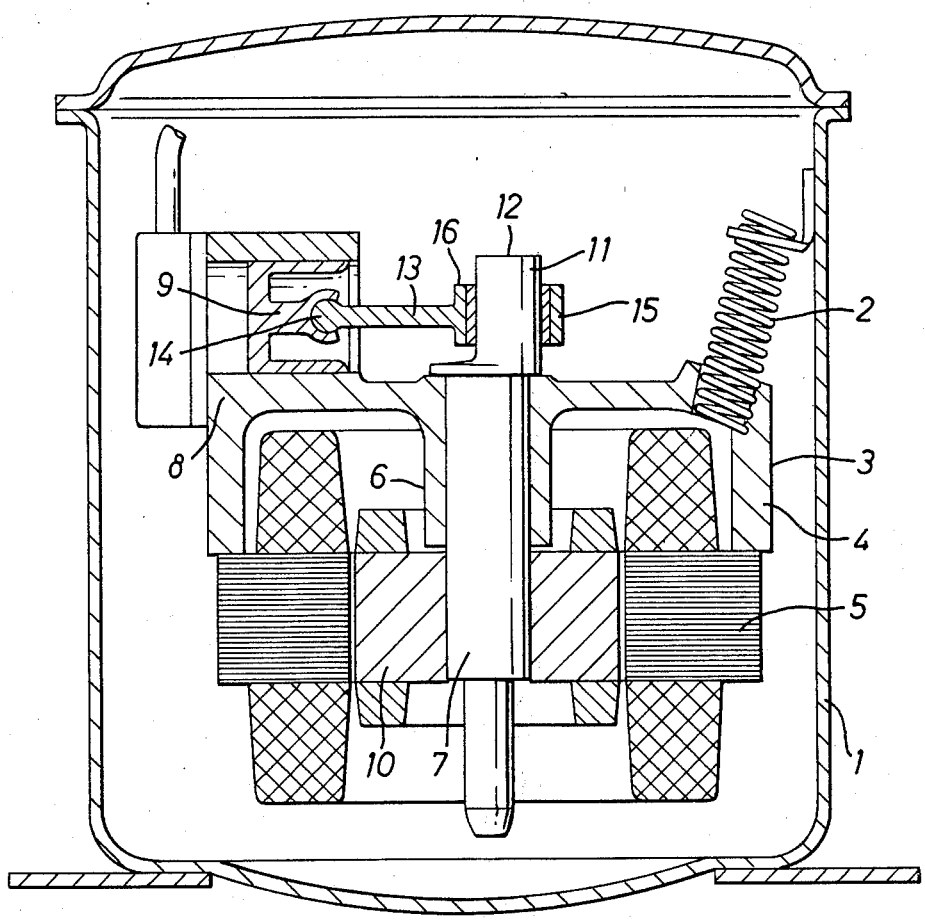

United States Patent [19]

Romer et al.

[11] 3,906,603
[45] Sept. 23, 1975

[54] METHOD OF ASSEMBLING A PISTON COMPRESSOR FOR SMALL ENCASED REFRIGERATING MACHINES

[75] Inventors: Bendt Wegge Romer, Sonderborg; Hans Kristian Pedersen, Nordborg, both of Denmark

[73] Assignee: Danfoss A/S, Nordborg, Denmark

[22] Filed: Nov. 8, 1973

[21] Appl. No.: 414,152

Related U.S. Application Data

[63] Continuation of Ser. No. 287,085, Sept. 7, 1972, abandoned.

[30] Foreign Application Priority Data

Sept. 7, 1971  Germany............................ 2144650

[52] U.S. Cl.............................. 29/156.4 R; 417/415
[51] Int. Cl.² .......................................... B23P 15/00
[58] Field of Search................ 29/156.4 R; 417/415; 74/44; 92/13.41, 187

[56] References Cited
UNITED STATES PATENTS

| | | | |
|---|---|---|---|
| 1,565,819 | 12/1925 | Saunders............................ | 92/13.41 |
| 2,343,211 | 2/1944 | Warneke et al. ....................... | 74/44 |
| 2,361,815 | 10/1944 | Bixler................................... | 92/187 |
| 2,738,122 | 3/1956 | Gardiner............................. | 417/415 |
| 3,610,784 | 10/1971 | Rundell............................... | 417/415 |

*Primary Examiner*—C. W. Lanham
*Assistant Examiner*—Dan C. Crane

[57] ABSTRACT

This invention relates to a method of assemblying a piston compressor in which the crankshaft and cylinder bores have intersecting right angled axes. The piston and connecting rod assembly is provided with a universal joint therebetween and a bearing surface having a closed wall at the opposite end of the connecting rod. The piston-connecting rod assembly is initially inserted into the cylinder followed by introducing the crankshaft into the crankshaft bore. By utilizing the piston-connecting rod universal joint the connecting rod bearing can be maneuvered into a position for placing the bearing on the crankshaft. A bushing is then inserted between the connecting rod bearing and crankshaft.

1 Claim, 5 Drawing Figures

METHOD OF ASSEMBLING A PISTON COMPRESSOR FOR SMALL ENCASED REFRIGERATING MACHINES

This is a continuation of appln. Ser. No. 287,085, filed 9/7/72, now abandoned.

The invention relates to a piston compressor, especially for small encased refrigerating machines and comprising a piston driven by a motor crankshaft through a connecting rod and an overhung crank pin, a piston joint being provided between the connecting rod and the piston, the head of the connecting rod containing an opening greater than the cross section of the crank pin, and a packing ring being fitted between the crank pin and the head of the connecting rod.

Difficulties often arise in piston compressors in connecting the head of the connecting rod, when linked to the piston, to the pin of the motor crankshaft. In the case of larger piston engines, the head of the piston rod is formed by two parts which are screwed together. In the case of smaller machines with correspondingly smaller connecting rod heads, a screwed connection of this kind is not possible.

U.S. Pat. No. 3,059,501 discloses piston compressor for a small encased refrigerating machine, in which compressor the head of the connecting rod contains an opening which is greater than the greatest cross-section of the crankshaft, which is determined by the zone where the shaft of the motor merges with the crank-pin, but which may also be increased in size by balance weights, for instance. Consequently, when the system is being assembled, first the piston can be introduced into the cylinder, and then the entire crankshaft can be pushed through the large opening in the head of the connecting rod to bring it into its final position. The crank-pin is then brought into the centre of that part of the opening having the greatest diameter, and a packing ring is fitted between the crank-pin and the head of the connecting rod. This results in a relatively large head to the connecting rod and a correspondingly large packing ring. The increased mass results in increased out-of-balance, which can only be rectified by the use of additional counterweights. Furthermore, the stability of the head of the connecting rod is affected by the large opening. Since the opening is not circular, approximately one quarter of the periphery of the packing ring is not in contact with the interior of the opening; it is loaded by a spring which is supported by a peg on an extension of the head of the connecting rod.

German Pat. No. 1,137,523 discloses a piston compressor in which the crank-pin extends into a slide ring which is displaceable in a guide sleeve connected directly to the piston. For the purpose of varying the deadcentre position, an eccentrically bored bushing is inserted in the bore of the slide ring and this bushing can be shrunk in at any required angular position with respect to the slide ring.

The object of the invention is to provide a piston compressor of the initially stated kind which has a smaller connecting rod head but which can nevertheless be assembled in a simple manner.

According to the invention, this object is achieved by the opening in the piston rod head being smaller than the greatest cross-section of the motor crankshaft, and by at least part of the connecting rod being tiltable, with the aid of a tilting joint, about an axis which is substantially at right angles to a plane defined by the axis of the piston and the axis of the shaft.

In this construction, the connecting rod head is swung over the crank-pin and secured with the aid of a packing ring only after the piston has been inserted in its cylinder and the shaft has been inserted. The tilting movement requires only a small amount of play, so that the opening in the connecting rod head and thus the connecting rod head itself can be kept small.

It is not necessary for the movement of the connecting rod head from the path of the crankshaft to be limited by the tilting movement, since the piston joint, present in any case, permits a swinging movement of the piston rod about an axis parallel with the shaft of the motor. Therefore an angle of tilt, through which the connecting rod head passes from the free end-face of the crank-pin to the working position, often suffices.

Furthermore, at least part of the connecting rod is advantageously rotatable about its own axis with the aid of a swivel joint. In this way the connecting-rod head can be so rotated at the commencement of the assembly operation that its smallest dimension, i.e. its depth, is located in planes at right angles to the axis of the shaft. Therefore, only a small angle of tilt and a small angle of swing are required.

Standard constructions can be used for the various joints. For example, the piston joint and the tilting joint can be constituted by a cross-head coupling. It is however particularly advantageous if the piston joint, the tilting joint and the swivel joint are formed by a single ball joint of the known kind. Considerable saving in space and weight is achieved by combining the three joints in this way.

In a preferred form of construction, the opening in the connecting-rod head is cylindrical and is virtually completely filled by the packing ring and the crank-pin. The connecting-rod head can take the form of a simple cylinder and can therefore be machined in a correspondingly simple manner. Since the opening in the connecting-rod head is completely filled, good transmission of power is ensured in each direction.

It is advantageous if the opening in the packing ring for receiving the crank-pin is disposed off-centre from its circumference. By turning the packing ring relatively to the piston-rod head, the piston can be set very easily in the dead-centre position.

For holding the off-centre position, axial grooves, which can be held in register in pairs by means of a pin, can be provided in the outer periphery of the packing ring and the inner periphery of the connecting-rod head.

Figure 2:
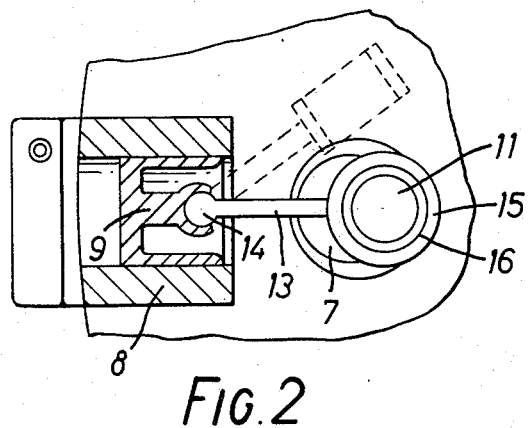
Figure 3:
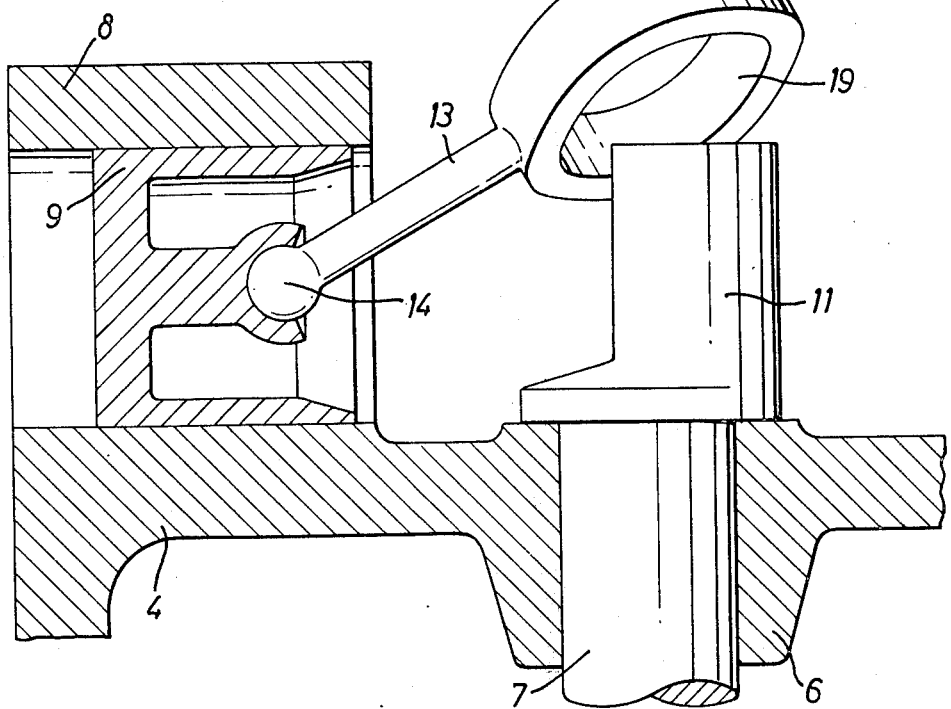
Figure 4:
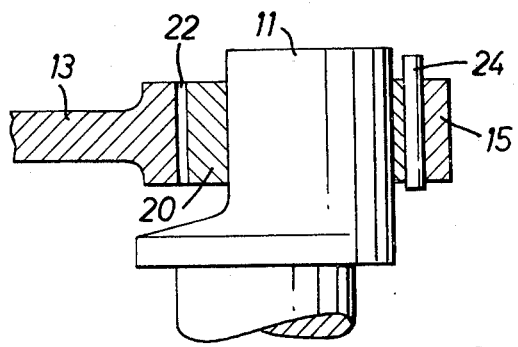
Figure 5:
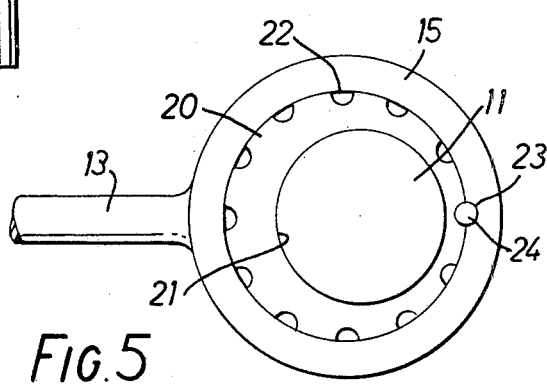

The invention will now be described in greater detail by reference to an embodiment illustrated in the drawing, in which:

FIG. 1 is a diagrammatic longitudinal section through an encased piston compressor, FIG. 2 is a plan view of part of the compressor of FIG. 1, FIG. 3 shows on a larger scale, part of the compressor during its assembly, FIG. 4 is a longitudinal section through a modified form of the connection between the crank-pin and the connecting-rod head, and FIG. 5 is a plan view related to FIG. 4.

FIG. 1 illustrates a case 1 in which a motor compressor 3 is suspended with the aid of springs 2. A support member 4 is used for mounting the stator 5 of an electric motor, comprises a bearing 6 for a motor crankshaft 7, and carries a cylinder 8 in which a piston 9 reciprocates. A rotor 10 is mounted on the shaft 7. At its upper end the shaft carries a crank-pin 11, the upper end 12 of which is unsupported. A connecting-rod 13 is connected to the piston through a ball joint 14. A connecting-rod head 15 of cylindrical form surrounds the crank-pin 11, a packing ring 16 being fitted between the head and the crank-pin. The packing ring takes the form of a cylinder in the arrangement illustrated in FIGS. 1–3. Its inside diameter 17 corresponds to the diameter 11 of the crank-pin. Its outside diameter 16 corresponds to the cylindrical opening 19 in the connecting-rod head 15. Lubricating means and the like have been omitted from the drawing, to keep it simple.

The assembly procedure is as follows: the piston 9 is pushed into the cylinder 8 from the inside. The connecting-rod 13 and its head 16 occupy the position shown in broken lines in FIG. 2, in which the crankshaft 7 of the motor can be introduced into the bearing 6 without being impeded by any other part. To do this, the connecting-rod head is turned through 90° from its working position so that it stands substantially perpendicular to the top face of the supporting member 4. The connecting rod is swung laterally of its working position. After the crank-shaft of the motor has been inserted, the following steps in the assembly operation are carried out:

a. the connecting-rod is tilted upwards (FIG. 3 shows this angle of tilt);
b. the piston head 15 is turned through 90° (FIG. 3 shows an intermediate position in this rotary movement);
c. the connecting-rod 13 is swung until the opening 19 in its head 15 is located above the crank-pin 11;
d. the connecting-rod 13 is swung downwards until its head 15 has reached its working position on the crank-pin 11;
e. the packing ring 16 is inserted in the space between the crank-pin 11 and the head 15 of the connecting rod.

The connecting rod can now only execute its normal movement in the plane determined by the axis of the piston.

It should be pointed out that in practice the steps (b)–(d) may overlap each other, so that to some extent still smaller angles of swing and rotation result. FIG. 3 shows that the connecting-rod head 15 can be swung to the side during rotation, and tilted downwards during further rotation.

In the arrangement shown in FIGS. 4 and 5, a packing ring 20 is provided which has an off-centre opening 21 for receiving the crank-pin 11. Twelve grooves 22 of semicircular cross-section are provided on the periphery of the packing ring. The connecting-rod head 15 contains a groove 23 also of semicircular cross-section. A pin 24 locks the off-centre packing ring 20 in a given angular position, so that the distance between the central axis of the crank-pin 11 and the edge of the end-face of the piston 9 can be adjusted.

In the examples of construction illustrated, the dimensions are such that first the piston 9 and then the crankshaft 7 of the motor are inserted. It is however, also possible first to insert the crankshaft 7 and then push the piston into the cylinder 8, with the connecting-rod 13 swung away to the side to the required extent.

It is also possible to use, as the piston joint, a joint having a normal piston axis, and to fit the tilting and swivel joints separately therefrom in the connecting rod 13 or in the stem connecting the piston joints to the piston. In all cases, after the head 15 of the connecting rod has been fitted on the crank-pin 11, only the joints necessary for operation become effective.

We claim:

1. A method of manufacturing a piston type compressor unit including a supporting member with a cylinder and a crankshaft bore having intersecting right angled axes, a piston and connecting rod assembly for said cylinder and a crankshaft for said bore, said connecting rod having a universal joint connection between said connecting rod and said piston and said crankshaft being formed with a crankpin which is cantilevered, said connecting rod further having a head defining a closed wall having an inside diameter larger than the diameter of said crankpin and a bushing fitting between said connecting rod head and said crankpin, said method comprising the steps of inserting the piston and connecting rod assembly into the cylinder, introducing the crankshaft into the crankshaft bore, utilizing said universal joint connection to tilt said connecting rod head relative to the axis of said crankshaft and thereby placing said connecting rod head in surrounding relation to said crankpin and inserting said bushing between said crankpin and connecting rod head.

* * * * *